June 4, 1957  D. H. McCUEN  2,794,569
COMPARTMENTED SADDLE TANK

Filed Feb. 24, 1954  2 Sheets-Sheet 1

INVENTOR.
DONALD H. McCUEN
BY Lindley E. Miller

June 4, 1957

D. H. McCUEN 2,794,569

COMPARTMENTED SADDLE TANK

Filed Feb. 24, 1954

INVENTOR.
DONALD H. McCUEN
BY
Lindley E. Mills

//www.united States Patent Office 2,794,569
Patented June 4, 1957

2,794,569

COMPARTMENTED SADDLE TANK

Donald H. McCuen, White Pigeon, Mich., assignor to Arrow Mfg. & Sales Co., Inc., White Pigeon, Mich., a corporation of Michigan Application February 24, 1954, Serial No. 412,249

2 Claims. (Cl. 220—20)

This invention relates to a tank for mounting on a vehicle chassis, particularly to a compartmented saddle tank for carrying a plurality of liquids.

In the operation of trucks and other commercial automotive vehicles, it is, of course, necessary to carry an adequate supply of fuel for operating the vehicle over long distances. Many such vehicles are equipped with hydraulic devices, e. g. for dumping the truck body and the like, and provision must, therefore, also be made for carrying a supply of hydraulic fluid. This may often amount to as much as 25 to 50 gallons or more. Inasmuch as the fuel and hydraulic fluid generally used have widely differing properties and cannot be used interchangeably, it thus becomes necessary to equip the vehicle with separate tanks or containers for these fluids.

It has been found convenient to carry fuel in a pair of drums or tanks mounted at the side of the frame members of the vehicle, generally immediately behind the cab of the vehicle. In this position they are not particularly in the way, do not interfere with the turning or loading and unloading of the vehicle and can be mounted sufficiently high so that they provide adequate clearance when the truck is run over rough surfaces. Such side tanks are often mounted by suspending them from the projecting ends of spaced supporting cross members which rest transversely on and are secured to longitudinal frame members of the vehicle. In some instances the supporting cross members have been enclosed or connected by top and bottom sheets to form a relatively thin, flat enclosure extending transversely of the vehicle and communicating at its open ends with the respective drums or side tanks, the total capacity of the fuel carrying system thus being increased appreciably. Fuel is generally conveyed from one or the other, or from both, of the side tanks to the vehicle engine as desired by a convention fuel pump through conduits located so as to permit the substantial emptying of the side tanks before the fuel supply fails. Fuel from the flat transverse enclosure resting on the vehicle frame members drains completely into the side tanks as fuel is used out of the latter. Such conventional fuel carrying tanks are generally referred to in the trade as "saddle tanks."

Although the conventional saddle tanks just described have proved highly satisfactory for the carrying of fuel, it has been necessary heretofore to provide other tanks entirely separate from the fuel storage system for the storage of hydraulic fluid when this is required in the operation of the vehicle. Such tanks generally have to be mounted at some inconvenient place on the truck body or frame because the transverse horizontal portion of the saddle type fuel tank just referred to generally occupies the most desirable space in which the hydraulic fluid storage could be located. In some instances it has even been the practice to mount the hydraulic fluid storage tank in this location and to then mount a pair of fuel storage tanks on the sides of the frame members by means of brackets or the like and to avoid entirely the use of transverse members resting on top of the frame members for supporting the side fuel tanks. Such arrangements are generally unsatisfactory due to the difficulty of mounting the side fuel tanks securely on the frame members so as to avoid undue vibration and even loosening of the tank in its supporting brackets. The necessity of a secure and rigid mounting of the fuel tanks is apparent in view of the fact that fuel is conveyed from the tank to the engine through small diameter, relatively light weight tubing and that vibration of such tubing must be kept to the minimum to avoid its breaking.

It has now been found that the difficulties occasioned by the necessity for providing storage for both fuel and hydraulic fluid on a vehicle can be overcome readily and economically by providing a saddle tank of somewhat conventional appearance when viewed from the outside but wherein the side fuel tanks are each separated from the transverse enclosure by appropriately placed partitions forming in the enclosure a transverse flat hydraulic fluid storage tank non-communicating with either of the side fuel tanks but with a portion of its walls at each end common with the wall of the respective fuel tank. In this manner there is provided adequate storage capacity for hydraulic fluid in the transverse tank and for fuel in the side fuel tanks, with no possibility of one liquid becoming contaminated with the other. By increasing the diameter of the side fuel tanks only very slightly, any sacrifice in fuel capacity can be avoided readily.

In addition, the structure provides for the proved saddle type of mounting for the fuel tanks and eliminates the necessity of providing and mounting separate containers for the two fluids. A sump having particular features hereinafter described is provided as an integral part of the horizontal hydraulic fluid storage tank to permit complete withdrawal of fluid therefrom under a suitable head and to permit mounting of the tank at substantially any location along the longitudinal frame members of the vehicle without interference with frame cross members and without undue elevation of the tank assembly above the frame.

The assembly of fuel and hydraulic fluid storage tanks is formed as an integral unit which can be mounted or demounted on the vehicle easily and is constructed of members shaped and arranged so that they can be secured together, e. g. by welding, with a minimum of effort and cost to provide an assembly which is strong, rigid and free of most of the objections inherent in previous methods for providing storage for both fuel and hydraulic fluid. Conventional means are provided for introducing hydraulic fluid into the hydraulic fluid storage tank and for withdrawing fluid from and returning it to the tank during normal operation of the hydraulic equipment.

The invention can be understood readily by reference to the accompanying drawing wherein, in the interest of clarity, certain features are shown on the somewhat exaggerated scale and wherein.

Figure 1:
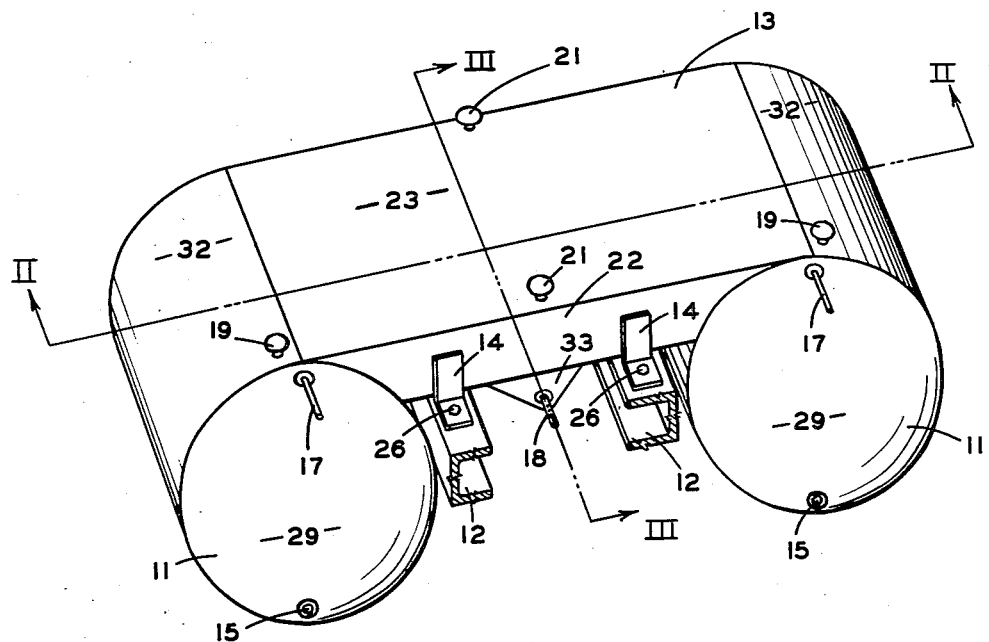
Figure 1 is an oblique elevation of a saddle tank embodying features of the invention.

The saddle tank of Figure 1 comprises a pair of side or fuel tanks 11 normally positioned alongside longitudinal frame members 12 of a truck or other vehicle chassis. The side tanks 11 are constructed integral with members defining a central or hydraulic fluid tank 13 which is non-communicating with the side tanks 11 and which is normally of flat rectangular shape and positioned so as to extend transversely across and above the frame members 12 of the vehicle. The central tank 13 is normally secured to the frame members 12 by suitable brackets 14 which are secured, e. g. by welding, to its side walls 22 and to the frame members 12, e. g. by bolts 26, a pad or gasket generally being inserted between the brackets and the frame members to absorb vibration. The brackets are preferably formed and located so that the bottom of central tank 13 is elevated slightly above the frame members 12 so as to avoid actual contact therebetween and thus to avoid any undue wear on the bottom wall of the tank.

Suitable drain plugs 15 can be mounted in the side tanks 11 so that they can be cleaned when necessary. Suitable conduits 17 are also provided communicating with the side tanks 11 through which the fluid therein can be withdrawn, e. g. for consumption in the power plant of the vehicle. A suitable conduit 18, which will be mentioned later, is provided communicating with the central tank 13, through which fluid, e. g. hydraulic fluid, can be drawn from the tank 13 for use as desired, e. g. for operating auxiliary hydraulic apparatus with which the truck may be equipped. The conduit 18 generally serves both for withdrawing fluid from and returning hydraulic fluid to the tank 13, although separate conduits may be utilized if so desired. Suitable capped filling means 19 and 21 are also provided for the tanks 11 and 13, respectively, through which fluid can be introduced into the respective tanks. It will be appreciated that the conduit 17 will generally be extended within the respective tanks in conventional fashion to a location such that substantially all of the fluid can be withdrawn from the tanks. The filler caps 19 and 21 are preferably provided with small vent openings whereby pressures inside and outside the respective tanks are equalized.

Figure 2:
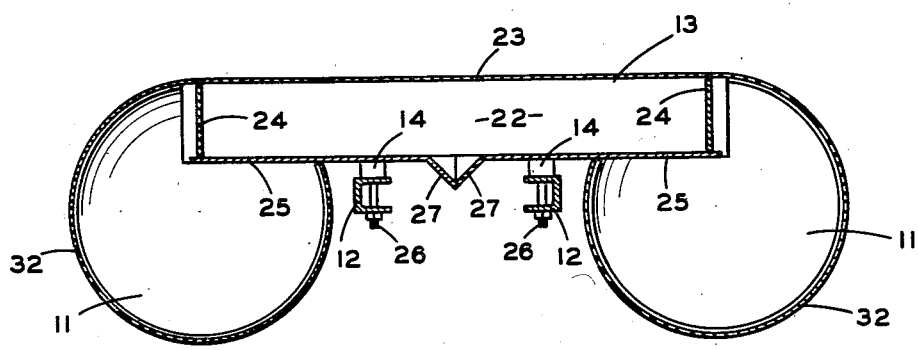
Figure 2 is a sectional elevation taken along the line II—II of Figure 1.
Figure 4:
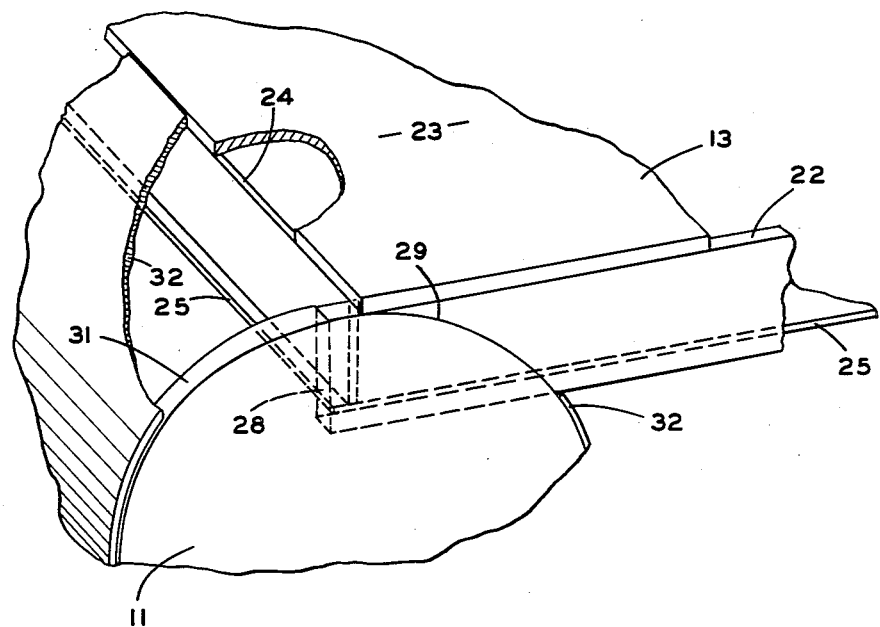
Figure 4 is a fragmentary oblique elevation, greatly enlarged and partially in section, of the saddle tank of Figure 1 showing preferred features of its construction.
Figure 3:
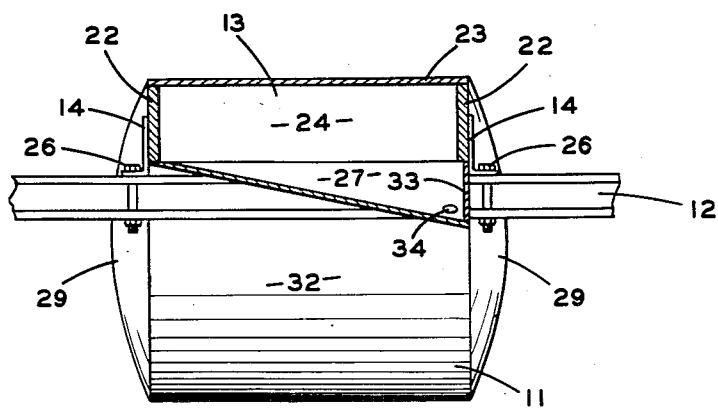
Figure 3 is an elevation, partially in section, taken along the line III—III of Figure 1.

It has been mentioned that the tanks 11 and 13 of the assembly of Figure 1 are non-communicating. One method of constructing the saddle tank of the invention is shown somewhat in detail in Figures 2, 3 and 4. In the modification shown the side walls 22 comprise a pair of suitably spaced relatively heavy members, such as a pair of plates, which also serve as reinforcing members from the ends of which the side tanks 11 are suspended. A pair of transverse end members 24 extend between and are secured, e. g. by welding, to the side members 22, thus forming a rectangular framework of convenient depth. The framework thus formed is covered with a top wall 23 consisting of a sheet which is secured around its edges, e. g. by welding, to the side members 22 and to the end members 24 in liquid tight fashion. The top wall 23 can conveniently be equipped with one or more filler spouts and caps 21.

The bottom wall of the tank 13 is preferably comprised of two similar members or sheets 25 joined together near the center of the tank 13, the purpose for which will be indicated later. Each bottom wall member 25 is secured, e. g. by welding, along its edges to the side members 22, and near its outer end, along the bottom edge of one of the end members 24, thus forming a fluid tight end of the tank 13. The ends of the side wall members 22 and of the bottom wall members 25 of the tank 13 generally project outwardly for a short distance beyond the end wall members 24 to facilitate welding of these members together.

The side tanks 11 are generally formed using conventional circular outwardly bumped ends or heads 29, each of which terminates at its circumference in a cylindrical head flange 31 coaxial with the longitudinal axis of the tank, the edges of the cylindrical side tank wall 32 being welded to the head flanges 31. In constructing the saddle tank of the invention, each head flange 31 is cut away for a distance sufficient to accommodate an end of one of the side wall members 22 and the attached bottom wall member 25 when an upper corner of the member 22 is butted against and flush with one of the cut ends of the flange with the upper side of the member 22 lying substantially perpendicular to the vertical radius of the side tank end member 29. The head 29 is then welded along the region where the flange is cut away to the outside of the side member 22. Each end tank wall 32 is then rolled to the proper curvature, slipped over a pair of the secured heads and welded along its edges to the respective head flanges 31 and to the top edges of the side walls 22 of the tank 13 which project outwardly beyond the end walls 24. Each tank wall 32 is cut, prior to assembling, so that one of its ends abuts an end of the top wall 23 of the tank 13 and its other end lies closely adjacent the lower side of the bottom wall 25 of the tank 13. The ends of the cylindrical tank wall 32 are then welded to these respective members, thus completing the fabrication of the respective end tank 11. There is thus secured an extremely rigid and strong construction which is well adapted to resist vibration and which is easy to fabricate.

As mentioned previously, the bottom wall of the tank 13 is preferably formed in two sections 25 which are joined together, e. g. by welding, usually at approximately the center of the tank. The bottom wall sections 25 are each formed at their inner ends, which are to be joined, with a triangular section 27 which is bent downward so that, when the two triangular sections are joined, they will form a triangular trough in the bottom of the tank 13 decreasing in depth from a maximum adjacent one side of the tank to a minimum depth adjacent the other side. The trough is usually formed so that at the point of minimum depth it merges into the plane of the bottom wall sections 25. Each triangular section 27 is formed with its base edge angularly located with respect to the adjacent edge of the rest of the section 25 so that, when the section is bent downwardly, the base edge of the triangular section lies in the plane of the edge of the rest of section 25. The triangular sections 27, in addition to being welded together along the bottom of the trough, are welded at their bases to a suitable triangular projection 33 depending from the corresponding side wall member 22 so as to close the end of the trough in liquid tight fashion. The depending triangular end 33 of the trough can be formed as an integral part of the side member 22 or it can be a section of lighter weight metal welded thereto.

The triangular trough just described constitutes an effective sump for the hydraulic fluid storage tank 13 from which fluid may be drawn under a head considerably greater than would be the case if the bottom wall of the flat tank were all in the same plane. This is advantageous in preventing the drawing of air into the hydraulic system even when the depth of fluid in the flat tank, exclusive of its depth in the sump, is at an undesirably low value.

A particular advantage of the tank assembly of the invention results from the fact that the sump just described has its maximum depth at one extreme edge of the tank 13 and is of little or no depth at the other edge of the tank. The assembly can thus be mounted on a vehicle with the greatest depth of the sump facing in either a forward or rearward direction, thus enabling the assembly to be mounted at substantially any position along the longitudinal frame members of the vehicle without hindrance from transverse frame members. If a transverse frame member interferes with the mounting of the tank at a particular location when the tank assembly is in one position, e. g. with the deepest end of the sump facing forward, the assembly can be turned end for end and can then generally be mounted in the desired location. At the same time it is not generally necessary to elevate the assembly unduly, e. g. by using higher brackets 14, or to a degree where it would in any way interfere with the working of the various parts of the vehicle, as in turning sharply. In addition, the fact that the sump extends clear across the bottom of the tank 13 and that it slopes along its bottom toward one side, i. e. longitudinally of the vehicle, enables substantially all of the fluid to be withdrawn from the tank regardless of whether the vehicle is headed upward or downward on a grade, provided, of course, that the vehicle is substantially level horizontally. In one modification contemplated, the bottom wall sections 25 of the tank 13 are formed with an upward and outward slope from the edges of the sump so that the tank is thinner vertically at its outer ends than at its center adjacent the sump. In such case the tank can be drained completely even though the vehicle may slope sideways. For best results the sump is formed so that its bottom edge has a slope with respect to the plane of the top wall of the tank 13 of at least about 1.5 inches in each foot of width of the tank. A conduit, which communicates with the sump at substantially its lowest point is provided for withdrawing hydraulic fluid from the tank 13 under the maximum hydrostatic head possible. This conduit can be located in the end wall 33 of the sump, as at 18 of Figure 1, or in one or both of the triangular side walls of the sump, as at 34 of Figure 3.

Although the invention has been described as adapted to the carrying and storing of an hydraulic fluid in the central horizontal compartment or tank 13 and of fuel, such as gasoline or diesel oil, in the two end compartments or tanks 11, it is pointed out that the invention is not limited in this respect since any fluid which it is desired to transport, either in connection with the operation of the vehicle and its equipment, or otherwise, can be stored or transported in any one or more of the three compartments. It is also pointed out that, although the end tanks 11 are preferably cylindrical, they can be fabricated in any other suitable shape desired without departing from the spirit of the invention.

I claim:

1. In a compartmented saddle tank adapted to be mounted astride a pair of longitudinal frame members of a vehicle, the combination including: a flat, substantially rectangular tank defined by a pair of heavy spaced supporting members forming its side walls, a pair of end wall members extending transversely between and secured to the side wall members adjacent their ends and top wall and bottom wall members secured along the top and bottom edges, respectively, of the side and end wall members; side tank heads secured in pairs opposite one another adjacent the ends of the flat tank side wall members, each head having a peripheral flange extending toward and essentially coplanar with the flange of the opposite head and each flange having a section cut away to accommodate an end section of the adjacent flat tank side wall member, the cut ends of the flange being secured along the upper edge of the end and along the bottom edge, respectively, of the side wall member and the head being secured along its periphery where the flange is cut away to the outside surface of the flat tank side wall member along a region removed from its end; and a side tank wall encircling and secured along its edges to a pair of opposite side tank head flanges, one end of the side tank wall abutting and being secured to an end of the flat tank top member and the other end of the side tank wall abutting the flat tank bottom member and being secured thereto along a region removed from the end wall of the flat tank.

2. A combination as claimed in claim 1 including: a sump in the bottom wall of the flat tank extending transversely of the tank and having a sloping bottom, the sump having its maximum depth adjacent one side of the tank and its minimum depth adjacent the other side of the tank whereby the saddle tank can be mounted astride a pair of longitudinal frame members of a vehicle in the vicinity of transverse frame members and interference of the transverse members with the sump avoided.

References Cited in the file of this patent

UNITED STATES PATENTS

| | | |
|---|---|---|
| 2,181,772 | Snyder | Nov. 28, 1939 |
| 2,276,963 | Griffin | Mar. 17, 1942 |
| 2,339,303 | Tillery | Jan. 18, 1944 |
| 2,530,819 | Hamlin | Nov. 21, 1950 |
| 2,569,493 | Prior | Oct. 2, 1951 |

FOREIGN PATENTS

| | | |
|---|---|---|
| 130,417 | Great Britain | Aug. 7, 1919 |
| 599,766 | Great Britain | Mar. 19, 1948 |